Sept. 12, 1933.                A. ALBRECHT                1,926,760
                              DRILL CHUCK
                          Filed March 16, 1933
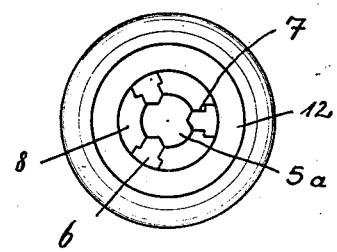
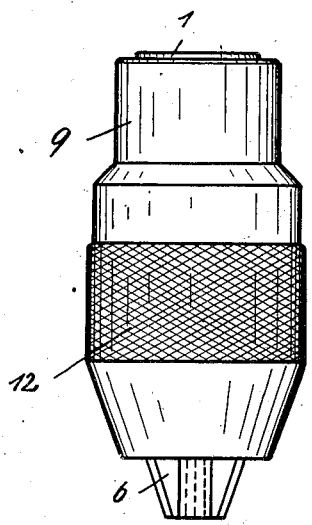
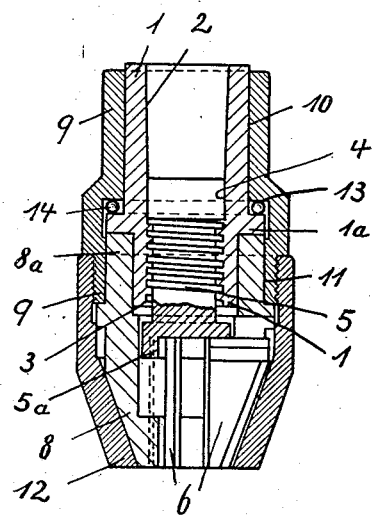
Inventor:
Arthur Albrecht
By [signature]
    Attorney.

UNITED STATES PATENT OFFICE 1,926,760

DRILL CHUCK

Arthur Albrecht, Esslingen-on-the-Neckar, Germany

Application March 16, 1933, Serial No. 661,155, and in Germany March 21, 1932

1 Claim. (Cl. 279—60)

The invention relates to drill chucks with clamping heads for the jaws, and in particular drill chucks of the kind in which there is a bush having a collar, with a ball bearing on the collar for taking the thrust. The object of the invention is to provide increased lateral bearing for the bush in drill chucks of this kind, so as to reduce the tendency to tilting and thus secure more even wear of the ball bearing.

For this purpose I provide a sleeve which fits the bush above the collar referred to and has an internal shoulder against which the balls on the collar bear, and I construct this sleeve with a downward extension of enlarged diameter which surrounds substantially all that portion of the bush which is below the collar, so that there is between this part of the bush and the sleeve an annular cavity, into which I fit an upward, tubular extension of the clamping head. By this means I provide the bush with lateral bearing both below and above the ball bearing, and this greatly assists in even drilling and in preservation of the ball bearing.

A chuck constructed in accordance with the invention is shown by way of example in the annexed drawing, in which Fig. 1 is an elevation thereof, with the jaws pushed out, in their closed position, Fig. 2 being a vertical section, with the jaws withdrawn and open, and Fig. 3 being a bottom plan view.

The bush 1 has a tapered bore 2 for the mandrel, and a collar 1a. Below the tapered bore 2 there is a short cylindrical bore 4, followed by an internal screw thread for receiving a screw 5 having a thrust piece 5a at its lower end. The thrust piece 5a has radial slots, in which the jaws 6 are movable. The jaws 6 are T-shaped in cross-section, and are guided in longitudinal slots 7 in a coned head 8, which has an upward cylindrical extension 8a fitting the lower part of the bush 1 and abutting against the collar 1a. A sleeve 9 slipped on to the bush 1 from the top has a comparatively long bore 10 into which fits the part of the bush above the collar 1a, and the sleeve has a downward extension approximately coterminous with the bush, with a bore 11 which fits the upward extension 8a of the head 8. A coned jaw clamping cap 12 is screwed to the lower end of the sleeve 9. Between the collar 1a and a shoulder 13 in the sleeve 9 there is a race of balls 14.

When screwed together the cap 12 and sleeve 9 constitute a shell, with which the head 8 is engaged for rotation, and by left-hand rotation of the shell the screw 5 is screwed into the bush 1, causing the thrust-piece 5a to move the jaws 6 upwards, so that withdrawal from the narrower part of the cap enables them to move radially apart (Fig. 2). After insertion of the drill shank between the jaws the shell is given right-hand rotation, causing the jaws to be pushed downwards and also to be moved inwards by contact with the tapered cap. The working of the drill serves automatically to tighten the grip of the jaws.

What I claim as my invention and desire to secure by Letters Patent of the United States is:—

In a drill chuck the combination of a bush having an external collar, a sleeve having a bore fitting said bush above said collar and having also an internal shoulder above said collar and a downward extension of enlarged diameter surrounding substantially all that part of said bush which is below said collar, a ball bearing between said collar and said shoulder, a cap tapered at its lower end screwed to the lower end of said sleeve, a clamping head fitted into said cap and having longitudinal slots, jaws engaged with the slots in said clamping head, a thrust piece engaged with said jaws, slotted for radial movement of said jaws, and a screw fixed to said thrust piece, screwed into the lower end of said bush, said clamping head having an upward tubular extension fitting between the lower part of said bush and the downward extension of said sleeve.

ARTHUR ALBRECHT.